(12) United States Patent
Shimada et al.

(10) Patent No.: US 7,313,702 B2
(45) Date of Patent: Dec. 25, 2007

(54) METHOD FOR ISSUING IDENTIFICATION INFORMATION

(75) Inventors: Muneki Shimada, Tokyo (JP); Toyoshi Okada, Tokyo (JP); Kenjiro Komaki, Saitama (JP); Yosuke Kimoto, Kanagawa (JP); Kazuhiro Kanee, Chiba (JP)

(73) Assignee: Sony Computer Entertainment Inc. (JP)

( * ) Notice: Subject to any disclaimer, the term of this patent is extended or adjusted under 35 U.S.C. 154(b) by 1047 days.

(21) Appl. No.: 10/243,088

(22) Filed: Sep. 13, 2002

(65) Prior Publication Data

US 2003/0074560 A1    Apr. 17, 2003

(30) Foreign Application Priority Data

Sep. 14, 2001 (JP) .............................. 2001-280412
Aug. 6, 2002 (JP) .............................. 2002-228570

(51) Int. Cl.
*H04L 9/00* (2006.01)

(52) U.S. Cl. ...................... 713/184; 713/171; 713/155; 380/283

(58) Field of Classification Search ................ 713/170, 713/182, 184, 156, 171, 155; 707/1; 705/56, 705/58; 455/418; 726/8; 711/164; 380/283
See application file for complete search history.

(56) References Cited

U.S. PATENT DOCUMENTS 5,842,124 A * 11/1998 Kenagy et al. ............. 455/418
6,070,141 A * 5/2000 Houvener et al. ............. 705/1
6,275,941 B1  8/2001 Saito et al.
6,976,164 B1 * 12/2005 King et al. ................. 713/156
2001/0000358 A1  4/2001 Isomichi et al.

FOREIGN PATENT DOCUMENTS

| EP | 1 126 732 A2 | 8/2001 |
| JP | 11-025048 A | 1/1999 |
| WO | WO-01/282733 A1 | 4/2001 |

* cited by examiner

*Primary Examiner*—T. B. Truong
(74) *Attorney, Agent, or Firm*—Lerner, David, Littenberg, Krumholz & Mentlik, LLP (57) ABSTRACT

A management server receives first user identification information and designation information for designating a service which are sent from a user terminal; detects specific information corresponding to a service provider which provides the desired service from a database containing specific information uniquely assigned to each service provider; generates second user identification information based on the detected specific information and the first user identification information; and then transmits the second user identification information to the user terminal. Using the second user identification information, the user terminal accesses the server of the service provider providing the desiring service. This prevents important information such as device IDs from being used when a user receives a service through a network from a service provider other than device manufacturers, and relieves the burden on such service provider upon providing a service.

15 Claims, 5 Drawing Sheets

METHOD FOR ISSUING IDENTIFICATION INFORMATION

CROSS-REFERENCE TO RELATED APPLICATIONS

This application claims priority from Japanese Patent Application Nos. 2001-280412 filed on Sep. 14, 2001, and 2002-228570 filed on Aug. 6, 2002, the disclosures of which are hereby incorporated by reference herein.

BACKGROUND OF THE INVENTION

The present invention relates to an apparatus and method for issuing identification information, a recording medium having recorded thereon a computer program for issuing identification information, a computer program for issuing identification information, an apparatus and method for processing information, a recording medium having recorded thereon an information processing program, and an information processing system, all of which are suitably used in various network service systems such as a service of downloading desired contents.

Currently, various content servers are provided on a network. A user accesses a content server on the network through his or her client terminal, such as a portable telephone or a personal computer, to thereby download a desired content, such as music or a movie.

In the case that content is downloaded from a content server on the network to the client terminal, the content server first identifies the user and then transmits the requested content to the user's client terminal. Various kinds of information can be used for identifying the user (hereinafter referred to as user identification information). In one example, identification information specific to each client terminal (hereinafter referred to as a device ID) is used as the user identification information. In this case, the device ID is added to information to be sent or received between any client terminal and any content server. The content server transmits to the user's client terminal the content requested by the user after identifying the user based on the device ID.

In the above case in which a device ID specific to each client terminal is added to information to be sent or received between the client terminal and the content server, however, the below-described problems may arise.

Manufacturers which manufacture or sell client terminals generally use the device IDs thereof for managing information on the users who buy the client terminals, for managing communications with the client terminals, for managing the maintenance of the client terminals, etc. That is, the device IDs are important information for the manufacturers.

On the other hand, services to be provided to users through a network can be varied. If a manufacturer could provide all the various services, a hardware product (terminal device) manufactured and sold by the manufacturer may have an increased value. However, it is difficult for the manufacturer to provide all such services by itself, so that the manufacturer must entrust other service providers with the services the manufacturer cannot provide. Besides, there may be a request for other service providers to provide a new service for hardware products (terminal devices) of the manufacturer.

For the case in which service providers other than the manufacturer provide a service, if the device ID is added to information to be exchanged between the service providers and the client terminal, the device ID important to the manufacturer can become known by the service providers, which may cause misuse of the device ID. For this reason, such a device ID is desirably added only to information to be exchanged between the client terminal and the manufacturer.

Besides, for the case in which information communication is performed between the client terminal and the manufacturer, the manufacturer has its own database which records the device IDs of all the hardware products manufactured and sold in the past by the manufacturer, and collates the device ID added to information sent from the client terminal with those recorded in its own database to identify the user. Therefore, if other service providers were allowed to use the device IDs as user identification information, there may be a need for the service providers to have their own databases which record all device IDs of the manufacturer, similarly to the manufacturer as described above. This increases the burden on the service providers intending to provide a service, which is not preferable.

SUMMARY OF THE INVENTION

Accordingly, in consideration of the above-noted problems, it is an object of the present invention to provide an apparatus and method for issuing identification information, a recording medium having recorded thereon a computer program for issuing identification information, a computer program for issuing identification information, an apparatus and method for processing information, a recording medium having recorded thereon a computer program for processing information, and an information processing system, all of which can prevent important information such as device IDs from being used for identifying a user when a service provider other than a manufacturer intends to provide a service to the user through a network, and can relieve the burden on service providers other than manufacturers when providing a service.

According to an aspect of the present invention, a management server of an information processing system receives at least first user identification information for identifying a user and designation information for designating a desired service from a user terminal (client terminal), based on which the management server detects specific information corresponding to a service provider which provides the desired service from a database having stored therein specific information uniquely assigned to each of a plurality of service providers which provide services. The management server generates second user identification information based on the detected specific information and the received first user identification information, and then transmits the second user identification information to the user terminal. Using the second user identification information, the user terminal accesses a server of the service provider providing the desired service to receive the service. The server of the service provider being accessed by the user terminal identifies the user of the user terminal based on the second user identification information.

In this system according to the present invention, not the first user identification information but the second user identification information is used to communicate between the user terminal and the server of the service provider. Therefore, the first user identification information will not be known by the server of the service provider. The first user identification information is at least one of identification information uniquely assigned to the user terminal, identification information uniquely assigned to a peripheral device for the user terminal, or identification information uniquely assigned to a recording medium. The server of the service provider identifies the user based on the second user identification information, so that the server need not keep, as its database, an enormous amount of first user identification information such as specific identification information on every user terminal, specific identification information on every peripheral device of every user terminal, and specific identification information on every recording medium.

Other and further objects and features of the present invention will become obvious upon an understanding of the illustrative embodiment about to be described in connection with the accompanying drawings or will be indicated in the appended claims, and various advantages not referred to herein will occur to one skilled in the art upon employing the invention in practice.

DETAILED DESCRIPTION

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

The present invention is applicable to content service systems for providing services of downloading desired contents to users.

Figure 1:
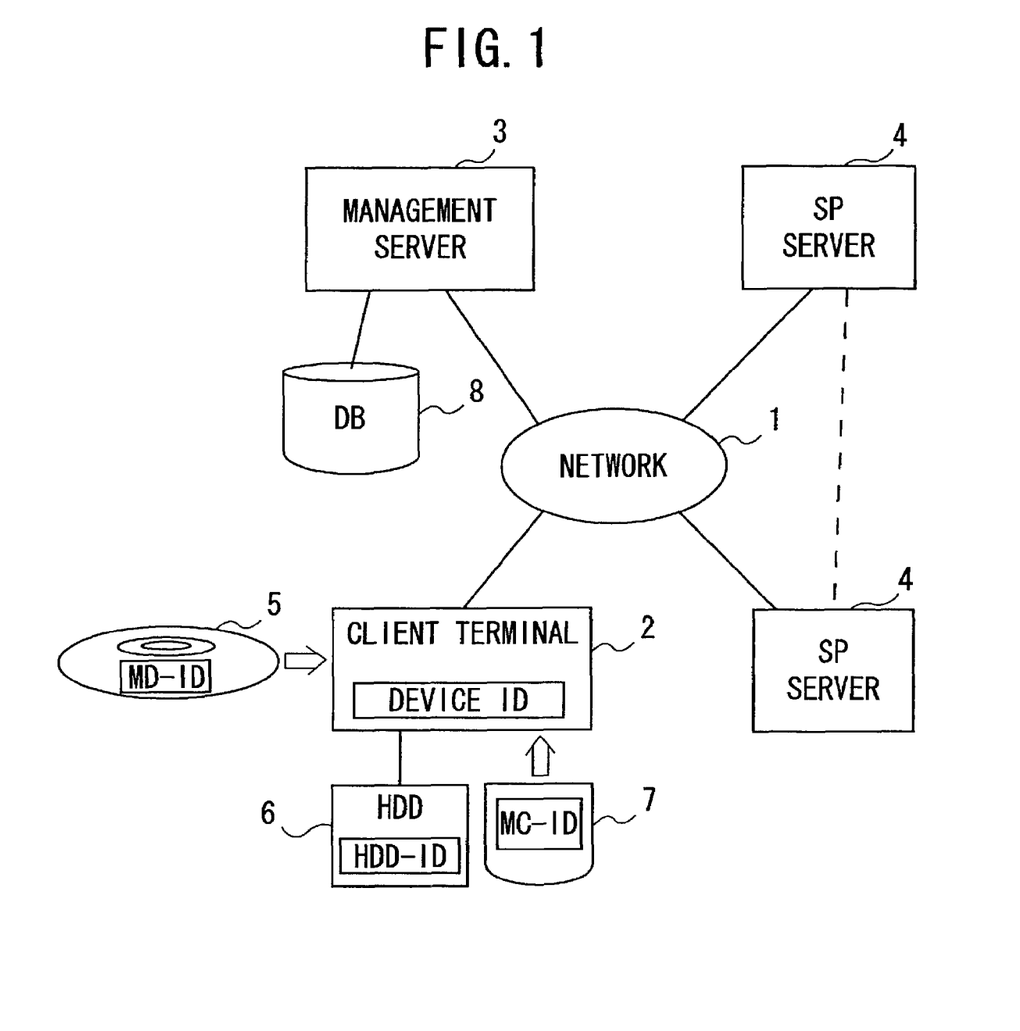
FIG. 1 illustrates the construction of a content service system according to an embodiment of the present invention.

Referring to FIG. 1, a content service system according to an embodiment of the present invention comprises a client terminal 2 of each user, a management server 3 for managing this system, and servers 4 of service providers which provide services of downloading contents, these components being connected with each other via a predetermined network 1, such as the Internet. In the following description, each service provider may be referred to as SP and the server 4 of each service provider may be referred to as SP server 4.

The client terminal 2 can be a video game machine, a personal computer, a PDA (Personal Digital Assistant), a portable telephone, or the like, having a communication function. The client terminal 2 is assigned identification information specific to the device (device ID).

The client terminal 2 is connectable with a hard disk drive (HDD) 6, a card-type memory card 7 with a semiconductor memory incorporated therein, and so on, as peripheral devices. The HDD 6 is assigned identification information specific to the HDD (hereinafter referred to as HDD-ID). Also, the memory card 7 is assigned identification information specific to the memory card (hereinafter referred to as MC-ID).

The client terminal 2 is provided with a media drive for reading out information recorded on a medium such as a CD-ROM or DVD-ROM, and for writing information onto or reading out information from a recordable or rewritable medium. Each medium 5 is assigned identification information specific to the medium (hereinafter referred to as MD-ID).

Such device IDs, HDD-IDs, MC-IDs, and MD-IDs are information managed by the manager of this content service system, and are unique to each client terminal, each HDD, each memory card, and each recording medium, respectively. Besides, the device IDs, HDD-IDs, MC-IDs, and MD-IDs are secret information for the system manager and the respective manufacturers to use for product management and user management.

Upon communication between the client terminal 2 and the management server 3, this system uses the device ID of the client terminal 2 as user identification information (hereinafter, this kind of user identification information will be referred to as first user identification information). As the first user identification information, one of the HDD-ID, MC-ID, MD-ID, user account, and user address or a combination of some of them, may be used in place of the device ID or together with the device ID. It is to be noted that a case will be described where the device ID of the client terminal 2 is used as the first user identification information upon communications between the client terminal 2 and the management server 3.

Although the detail will be described later, as user identification information used upon communications between the client terminal 2 and SP server 4 (hereinafter, this kind of user identification information will be referred to as second user identification information), this system uses an SP-ID, which is information dedicated to each service provider and specific to each user. The SP-ID is issued by the management server 3 of this system which will be described later in detail.

Accordingly, in the system of the embodiment, the device ID as the first user identification information is used only upon communications between the corresponding client terminal 2 and the management server 3, and is not used upon communications between the client terminal 2 and the SP server 4. Thus, in this system, the device ID which is important for the system manager and the manufacturer of the device is never sent to the SP server 4, so that the device ID is kept secret from any service provider.

The management server 3 has a database (DB) 8. In this database 8, the device IDs of all client terminals 2 managed by the system manager and user information on the users who are the owners of the respective client terminals 2 assigned the device IDs, are stored so that both may correspond to each other. Besides, in this database 8, the HDD-IDs of all HDDs 6, the MC-IDs of all memory cards 7, and the MD-IDs of all media 5 which are managed by the system manager, and user information on the users who are the owners of the respective HDDs 6, memory cards 7, and media 5, are also stored so that each piece of identification information may correspond to each piece of user information.

Figure 2:
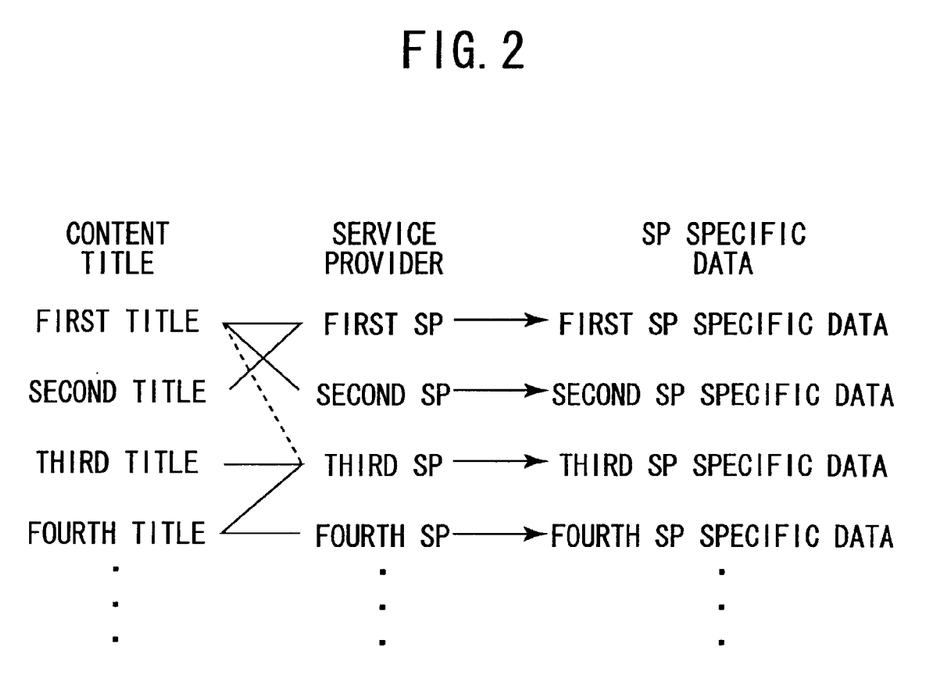
FIG. 2 illustrates the relationship between the titles of contents to be provided by the content service system and the service providers (SPs) which provide services corresponding to the respective titles.

Furthermore, in the database 8, information on a plurality of titles of contents, information on the service providers which can provide the respective contents, and data specific to each service provider (hereinafter referred to as SP specific data) are stored as illustrated in FIG. 2. In the example of FIG. 2, the content to be provided by each service provider is music or a movie. Information on the title of each piece of content is stored in the database 8.

More specifically, the exemplary case in FIG. 2 shows that the content of a first title can be provided by first and second service providers (first and second SPs) and the content of a second title can be provided by the first SP. In the same way, the content of a third title can be provided by a third service provider (third SP) and the content of a fourth title can be provided by the third SP and a fourth service provider (fourth SP). For the first to fourth SPs, first to fourth SP specific data have been set, respectively. The first to fourth SP specific data may be set by the manager for the respective service providers, or each service provider may set such SP specific data for itself.

As for each piece of content to be provided, there may be a case where the service provider itself hoped to provide the content, or a case where the service provider has been entrusted by the system manager with the service of providing the content. In either case, the system manager constructs the database 8 comprising information on the titles of contents, information indicating the service providers which can provide the respective contents, and the SP specific data corresponding to the respective service providers.

The information stored in the database 8 may be added to, eliminated, and also changed. For example, in the case of FIG. 2, if the server of the third SP providing the contents corresponding to the third and fourth titles becomes available to also provide the content corresponding to the first title, the system manager updates the database 8 so that the first title may also correspond to the third service provider, as shown by the dotted line in FIG. 2. Thus, additions, eliminations, and changes can easily be made with respect to the relationships between the titles and the SP servers, and the SP specific data.

Next, the process flow for the client terminal 2 to acquire an SP-ID will be described with reference to the flowchart of FIG. 3.

Figure 3:
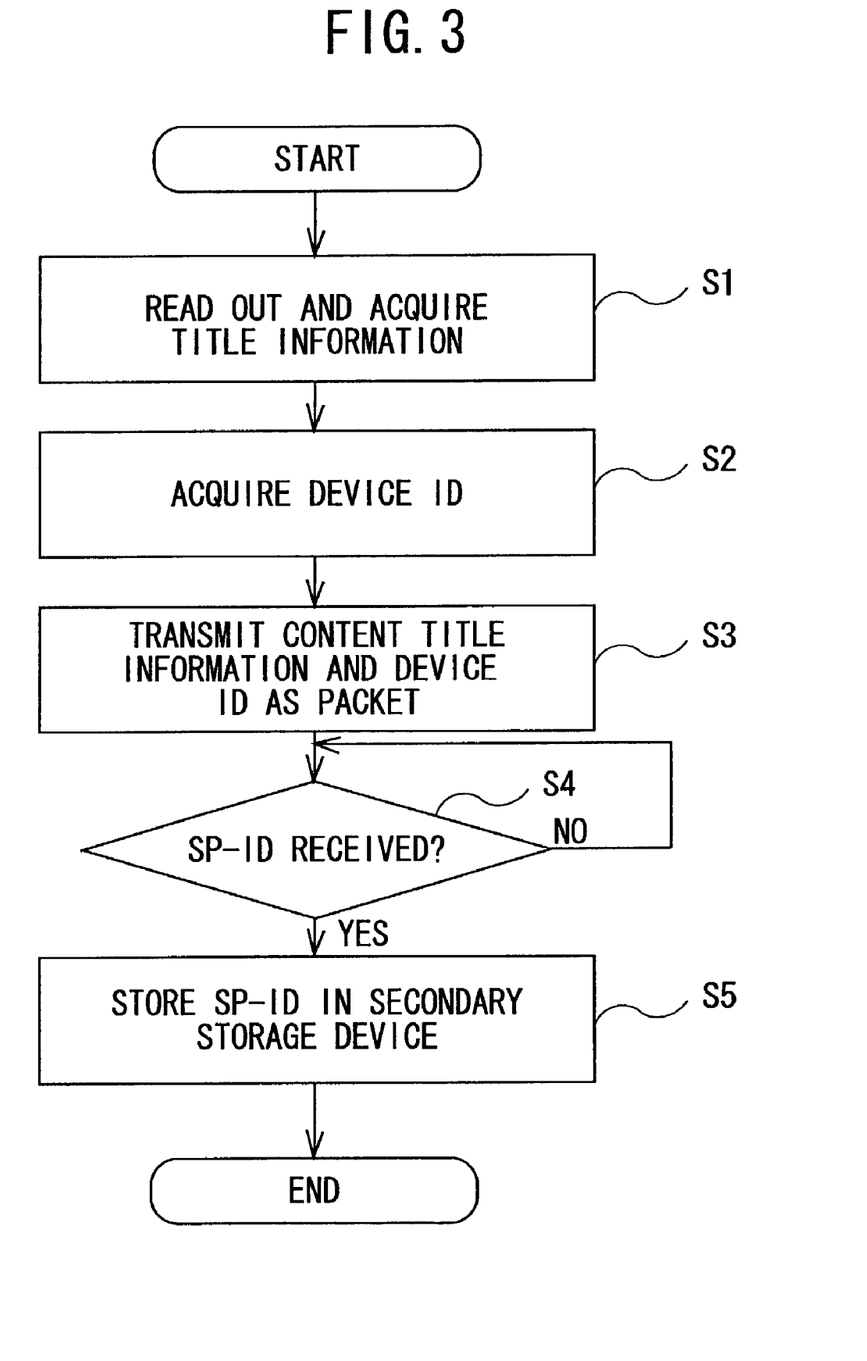
FIG. 3 is a flowchart of the procedure for a client terminal to acquire second user identification information (SP-ID)

The process as shown in FIG. 3 starts when the client terminal 2 reads out information from loaded medium 5. Note here that such medium 5 records therein information on a plurality of titles of contents, a connecting program for making connections through the network 1 with the management server 3 and the SP servers 4 which can provide the respective contents, a GUI (Graphical User Interface) program for providing an interface between the client terminal 2 and the user of the client terminal 2, etc. Although the detail will be described later, each content is provided generally in a form having been coded with a given SP-ID and the medium 5 also has recorded thereon a decoding program for decoding the content by using the SP-ID.

In step S1, the client terminal 2 reads out information on each title from the medium 5 loaded on the client terminal 2. The client terminal 2 then displays the read-out information on the titles on a monitor screen (not illustrated). The process goes to step S2 when the user of the client terminal 2 selects the information on a desired title from the information on all titles displayed on the monitor screen. It is also possible for the user to directly input such information on a desired title using an inputting device (not illustrated). Note that the client terminal 2 does not necessarily need to display the title information read out from the medium 5 on the monitor screen. That is, the information acquired at step S1 should just be that which can be interpreted by the server 3, which means that the client terminal 2 has only to acquire the title information without displaying it on the monitor screen in the case in which the title information is the same as that of the MD-ID.

In step S2, the client terminal 2 acquires the device ID stored in an internal nonvolatile memory, for example, upon which the processing advances to step S3. For the case that an HDD-ID, MC-ID, MD-ID, or the like, is used in place of the device ID or together with the device ID, the client terminal 2 acquires this information in step S2.

In step S3, the client terminal 2, for example, packetizes the title information acquired in step S1 and the device ID acquired in step S2, and then transmits the packet to the management server 3 through the network 1, at which point the process advances to step S4.

Figure 4:
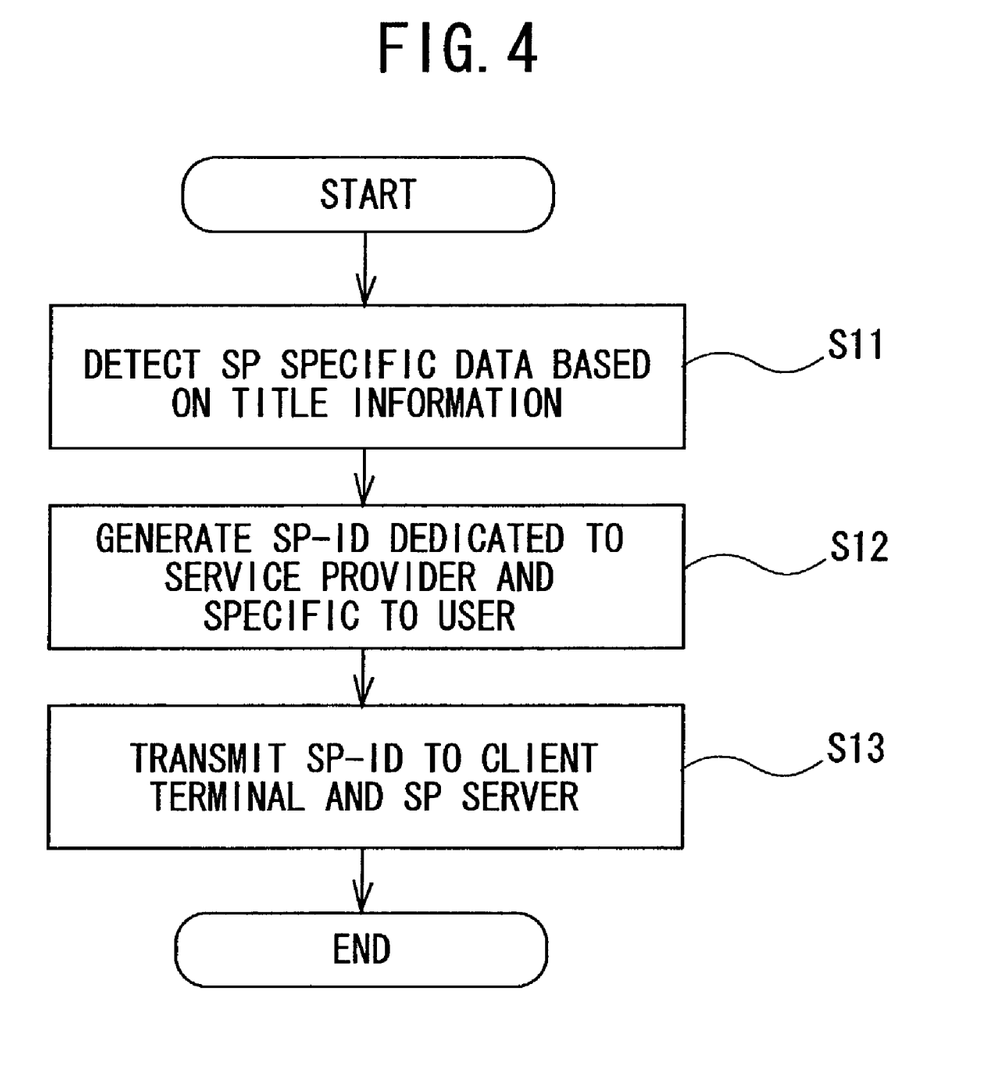
FIG. 4 is a flowchart of the procedure for a management server to issue the second user identification information.

Although the detail will be described later with reference to FIG. 4, the management server 3, having received the title information and the device ID, refers to its database 8 to issue an SP-ID which is dedicated to a service provider providing the content corresponding to the title information, and which is specific to the client terminal 2 having the received device ID (i.e., specific to the user of the client terminal 2). The management server 3 then transmits the SP-ID to the client terminal 2.

In step S4, the client terminal 2 checks whether the SP-ID has been sent from the management server 3. If the client terminal 2 receives the SP-ID, the process advances to step S5.

In step S5, the client terminal 2 stores the SP-ID sent from the management server 3 in a secondary storage device such as an HDD 6 or a memory card 7, at which point the process shown in FIG. 3 ends.

The SP-ID stored in the secondary storage device is used as second user identification information upon communications between the user and the SP server 4. The detail will be described later with reference to the flowchart of FIG. 5.

Next, the process for the management server 3 to issue an SP-ID will be described with reference to the flowchart of FIG. 4. This process starts when the management server 3 receives a packet of title information and a device ID sent from a client terminal 2.

In step S11, the management server 3 refers to its database 8 based on the title information sent from the client terminal 2, to thereby detect the SP specific data corresponding to a service provider which can provide the content of the title information, after which the process goes to step S12. It is to be noted that, if two or more service providers can provide the content corresponding to the title information received from the client terminal 2, the management server 3 can request the user to instruct the management server 3 which of the service providers the user wants to access. In such case, the management server 3 detects the SP specific data corresponding to the service provider in accordance with the user's instruction.

In step S12, the management server 3 generates an SP-ID which is dedicated to the service provider providing the content corresponding to the title information, and which is specific to the client terminal 2 (i.e., specific to the user) based on the SP specific data detected in step S11 and the device ID received from the client terminal 2, whereupon the process advances to step S13. More specifically, in this step S12, the management server 3 performs a predetermined arithmetic operation according to, e.g., the Hash method, to generate a fixed-length pseudorandom number (Hash value) from the SP specific data and device ID in order to use the pseudorandom number as the SP-ID. That is, the SP-ID consisting of the pseudorandom number is used as identification information which is dedicated to the service provider providing the content corresponding to the title information, and which is specific to the client terminal 2 (i.e., specific to the user).

In step S13, the management server 3 transmits the SP-ID to the client terminal 2. In addition, the management server 3 transmits the SP-ID to the SP server 4 of the service provider providing the content to be distributed based on the SP-ID. It is to be noted that, if two or more service providers can provide the content to be distributed based on the SP-ID, the management server 3 transmits the SP-ID to the SP servers 4 of all such service providers. The SP server 4 having received the SP-ID from the management server 3 stores the SP-ID in its internal database, for example.

Also, in the case that the HDD-ID, MC-ID, or MD-ID is used as the first user identification information in place of the device ID, the management server 3 can issue a similar SP-ID based on such IDs and the SP specific data. Particularly in the case that the MD-ID is used in place of the device ID, the resultant SP-ID can be used as information for identifying the medium itself. In such case, the SP-ID is valid even when the user of the medium 5 has changed. Furthermore, in the case that some IDs are used in combination, for example, the device ID of the client terminal 2 in combination with the HDD-ID of the HDD incorporated in the client terminal 2, the resultant SP-ID can be information for identifying the user more specifically.

Instead of generating such SP-ID in real time according to the Hash method or the like, the management server 3 may have recorded in advance in its database 8 a lookup table for device IDs, SP specific data of service providers, and SP-IDs. The management server 3 may refer to the lookup table based on the SP specific data detected in step S11 and the device ID sent from the client terminal 2, to thereby issue a proper SP-ID.

In either the case of generating the SP-ID by a predetermined arithmetic operation, or the case of looking up the SP-ID in a table, the SP-ID to be issued by the management server 3 is uniquely determined based on the device ID and the SP specific data. Thus, even if the SP-ID stored in the above-described secondary storage device were erroneously erased, the user can acquire, by a second request, a new SP-ID which is also dedicated to the service provider providing the content which corresponds to the title information, and which is specific to the client terminal 2 of the user.

Next, the process for a user to receive a desired content from a service provider will be described with reference to the flowchart of FIG. 5.

Figure 5:
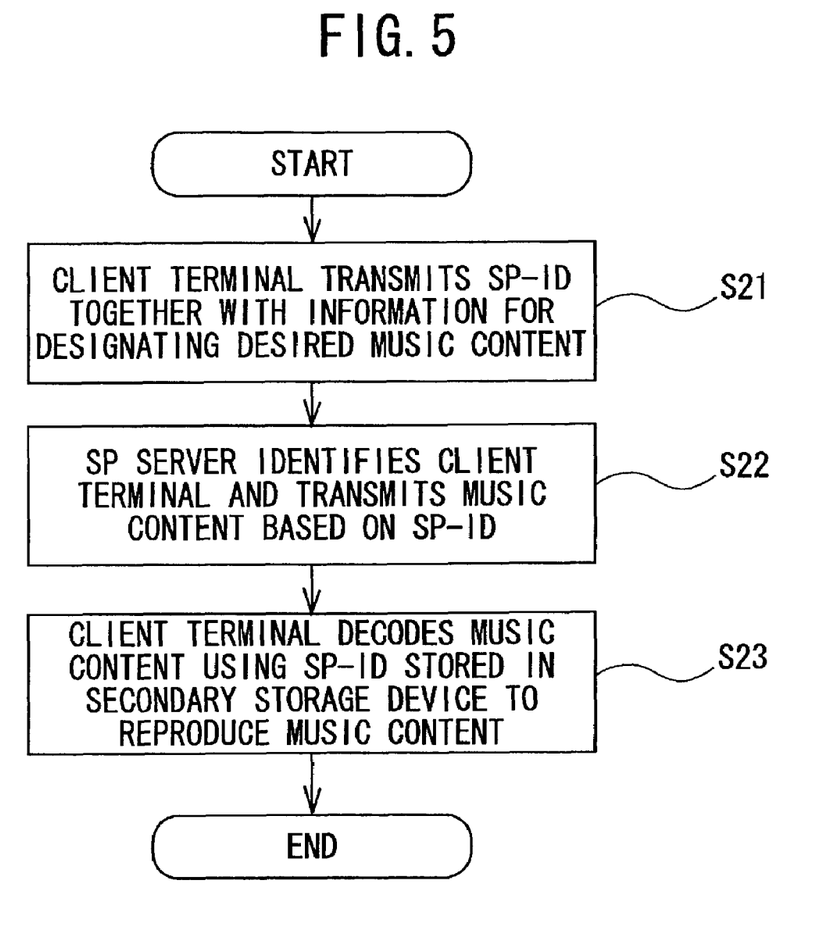
FIG. 5 is a flowchart of the procedure for a client terminal to receive a desired service from the service provider.

The flowchart of FIG. 5 illustrates the process for a client terminal 2 to download a desired music content from a service provider which provides services of downloading music contents, and then to reproduce the music content, for example. In the case of this example, the title information read from the medium 5 by the client terminal 2 is that for a plurality of music contents. Also, the SP-ID issued by the management server 3 for the user is dedicated to accessing the service provider which provides such a music content, and is specific to the user.

The process shown in FIG. 5 starts when the user selects the desired one of the titles recorded in the medium 5, and then the communication line is connected between the client terminal 2 of the user and the SP server 4 of the service provider which provides the music content corresponding to the desired title. Before the process beings, an SP-ID issued by the management server 3 is stored in the secondary storage device.

In step S21, the client terminal 2 reads out the SP-ID from the secondary storage device and transmits information indicating the desired music content together with the SP-ID to the SP server 4 of the service provider.

In step S22, the SP server 4 first authenticates whether the SP-ID received from the client terminal 2 has been assigned by the management server 3 to a proper user by referring to the SP-IDs which have been sent from the management server 3 and accumulated in the internal database of the SP server 4. The SP server 4 determines that the client terminal 2 has been certified by the manager only when the SP-ID received from the client terminal 2 coincides with one of the SP-IDs in the internal database, whereupon the SP server 4 accepts the access by the client terminal 2.

In another example, it is also possible that, when the SP server 4 receives an SP-ID from a client terminal 2, the SP server 4 may always determine that the client terminal 2 already has been certified by the management server 3 without the above-described authenticating operation using the SP-IDs in its internal database. In this example, the management server 3 functions as a gateway, so that the SP server 4 needs not authenticate any client terminal 2 which has been assigned an SP-ID by the management server 3. This relieves the processing load on the SP server 4.

When the SP server 4 determines that the client terminal 2 has been properly certified, the SP server 4 reads out, from its internal database, the desired music content corresponding to the information sent from the client terminal 2. The SP server 4 then encodes the data of the music content based on the SP-ID received from the client terminal 2, and transmits the encoded data to the client terminal 2.

In step S23, the client terminal 2 again reads out the SP-ID from the secondary storage device. Using the SP-ID, the client terminal 2 decodes the encoded data of the music content received from the SP server 4, and reproduces the music content. This allows the user to enjoy the music content downloaded from the SP server 4.

For the case that such SP-IDs are accumulated in the secondary storage device of a client terminal 2, the internal database of an SP server 4, and also in the database 8 of the management server 3, for example, the SP server 4 can specify the client terminal 2 to transmit data to, regardless of the presence of an access from the client terminal 2. Such an SP-ID is information for identifying not only the user but also a content, so that the SP server 4 can have information on the user who used the services of downloading contents (information as to what kind of contents the user requested to download and which services the user requested) by keeping SP-IDs received from the client terminal 2. On the basis of the information as to what kind of contents the user requested to download and which services the user requested, the SP server 4 can provide a guide, advertisement, or the like of a new service to the user. Also, the management server 3 can reproduce, from SP-IDs stored in its database 8, information for identifying the device ID and content corresponding to each SP-ID, thereby identifying each client terminal 2 (i.e., the user of the client terminal 2), and knowing what kind of contents and services the user requested. The manager can construct a new content service system or improve the existing service system based on such information, and can provide a guide, advertisement, or the like of a new service system to the users.

As is clear from the above, in the content service system according to this embodiment, the management server 3 issues an SP-ID and utilizes the SP-ID for communications between any client terminal 2 and any SP server 4, which can prevent device IDs from being known by any service provider as a third party other than the users and the manager.

Such SP-ID is issued for each service provider. Therefore, each service provider need not keep an enormous number of device IDs for identifying each user in its own database. Additionally, each service provider can easily construct systems for providing various services.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

For example, it is alternatively possible that the SP-ID may be dedicated to one of various services provided by a service provider and be specific to a user, or that the SP-ID may be dedicated to one of various contents provided by a service provider and be specific to a user.

As described above, according to the present invention, when a user intends to receive some service through a network from a service provider other than the manufacturer of the client terminal device of the user, important information such as the device ID of the client terminal device is prevented from being used as information for identifying the user. In addition, the burden can be relieved on any service provider other than device manufacturers to construct a service providing system.

The invention claimed is:

1. An apparatus for issuing identification information, said apparatus comprising:
   a database having stored therein service provider information assigned to a plurality of service providers such that a given portion of the service provider information is assigned to a particular one of the plurality of service providers;
   a receiving unit operable to receive, from a terminal of a user, first identification information identifying the user and designation information identifying a service requested by the user;
   a detector operable to detect, by referring to said database, a specific portion of the service provider information that is assigned to a selected one of the plurality of service providers, the selected one of the plurality of service providers being capable of providing the requested service;
   a generating unit operable to generate second identification information using the detected specific portion of the service provider information assigned to the selected one of the plurality of service providers and the first identification information, the second identification information being unique to that pairing of the selected one of the plurality of service providers and the user; and
   a transmitting unit operable to transmit the second identification information to the terminal of the user so that the terminal of the user is able to transmit the second identification information to the selected one of the plurality of service providers without transmitting the first identification information.

2. The apparatus according to claim 1, wherein the transmitting unit is operable to transmit the second identification information to at least one of the selected service provider or a server of the selected service provider.

3. The apparatus according to claim 1, wherein the first identification information is at least one selected from the group consisting of identification information assigned to the terminal of the user, identification information assigned to a peripheral device of the terminal of the user, and identification information assigned to a recording medium of the terminal of the user.

4. The apparatus according to claim 1, wherein the second identification information comprises pseudorandom numbers obtained by a predetermined arithmetic operation using the first identification information and the detected specific information.

5. The apparatus according to claim 1, further comprising:
   a table including a plurality of portions of the second identification information, a plurality of portions of the first identification information, and a plurality of portions of the specific information; and
   the generating unit being operable to select the portion of the second identification information that is unique to the pairing of the selected one of the plurality of service providers and the user using the table.

6. An apparatus for issuing identification information, said apparatus comprising:
   a database having stored therein service provider information assigned to a plurality of service providers such that a given portion of the service provider information is assigned to a particular one of the plurality of service providers;
   a receiving unit operable to receive, from a terminal of a user, first identification information identifying the user and designation information identifying a service requested by the user;
   a detector operable to detect, by referring to said database, a specific portion of the service provider information that is assigned to a selected one of the plurality of service providers, the selected one of the plurality of service providers being capable of providing the requested service;
   a generating unit operable to generate second identification information using the detected specific portion of the service provider information assigned to the selected one of the plurality of service providers and the first identification information, the second identification information being unique to that pairing of the selected one of the plurality of service providers and the user; and
   a transmitting unit operable to transmit the second identification information to a server of the selected service provider without transmitting the first identification information.

7. The apparatus according to claim 6, wherein the first identification information is at least one selected from the group consisting of identification information assigned to the terminal of the user, identification information assigned to a peripheral device of the terminal of the user, and identification information assigned to a recording medium of the terminal of the user.

8. A method of issuing identification information, said method comprising:
   receiving, from a terminal of a user, first identification information identifying a terminal of a user and designation information identifying a service requested by the user, the first identification information being unique to that user;
   detecting, by referring to a database having stored therein service provider information assigned to a plurality of service providers such that a given portion of the service provider information is assigned to a particular one of the plurality of service providers, a specific portion of the service provider information that is assigned to a selected one of the plurality of service providers, the selected one of the plurality of service providers being capable of providinge the requested service;

generating second identification information using the detected specific portion of the service provider information assigned to the selected one of the plurality of service providers and the first identification information, the second identification information being unique to that pairing of the selected one of the plurality of service providers and the user; and transmitting the second identification information to the terminal of the user so that the terminal of the user is able to transmit the second identification information to the selected one of the plurality of service providers without transmitting the first identification information.

9. A computer-readable recording medium having recorded thereon a program or carrying out a method of issuing identification information, said method comprising:

receiving, from a terminal of a user, first identification information identifying a terminal of a user and designation information identifying a service requested by the user, the first identification information being unique to that user;

detecting, by referring to a database having stored therein service provider information assigned to a plurality of service providers such that a given portion of the service provider information is assigned to a particular one of the plurality of service providers, a specific portion of the service provider information that is assigned to a selected one of the plurality of service providers, the selected one of the plurality of service providers being capable of providinge the requested service;

generating second identification information using the detected specific portion of the service provider information assigned to the selected one of the plurality of service providers and the first identification information, the second identification information being unique to that pairing of the selected one of the plurality of service providers and the user; and transmitting the second identification information to the terminal of the user so that the terminal of the user is able to transmit the second identification information to the selected one of the plurality of service providers without transmitting the first identification information.

10. A system for issuing identification information, said system comprising:

a computer having a processor operable to execut instructions; and a computer-readable medium having recorded thereon a computer program having instructions for carrying out a method of issuing identification information, said method including:

receiving, from a terminal of a user, first identification information identifying a terminal of a user and designation information identifying a service requested by the user, the first identification information being unique to that user;

detecting, by referring to a database having stored therein service provider information assigned to a plurality of service providers such that a given portion of the service provider information is assigned to a particular one of the plurality of service providers, a specific portion of the service provider information that is assigned to a selected one of the plurality of service providers, the selected one of the plurality of service providers being capable of providinge the requested service;

generating second identification information using the detected specific portion of the service provider information assigned to the selected one of the plurality of service providers and the first identification information, the second identification information being unique to that pairing of the selected one of the plurality of service providers and the user; and transmitting the second identification information to the terminal of the user so that the terminal of the user is able to transmit the second identification information to the selected one of the plurality of service providers without transmitting the first identification information.

11. A method of processing information, said method comprising:

acquiring first identification information including at least one selected from the group consisting of identification information assigned to a terminal of a user, identification information assigned to a peripheral device of the terminal of the user, and identification information assigned to a recording medium readable by the terminal of the user;

acquiring designation information identifying a service requested by the user;

transmitting the first identification information and the designation information to a predetermined management server;

receiving, from the predetermined management server, second identification information unique to the pairing of the user and a service provider selected to provide the requested service to the user; and accessing a server of the selected service provider to obtain the requested service by transmitting the second identification information to the server without transmitting the first identification information.

12. An apparatus for processing information, said apparatus comprising:

an identification information acquiring unit operable to acquire first identification information including at least one selected from the group consisting of identification information assigned to a terminal of a user, identification information assigned to a peripheral device for the terminal of the user, and identification information assigned to a recording medium readable by the terminal of the user;

a designation information acquiring unit operable to acquire designation information identifying a service requested by the user; and a communication unit operable to transmit the first identification information and the designation information to a predetermined management server, to receive second identification information from the predetermined management server, the second identification information being unique to the pairing of the user and a service provider selected to provide the requested service, and to access a server of the selected service provider transmitting the second identification information without transmitting the first identification information.

13. A computer-readable recording medium having recorded thereon an information processing program to be executed on a computer, the program comprising:

acquiring first identification information including at least one selected from the group consisting of identification information assigned to a terminal of a user, identification information assigned to a peripheral device of the terminal of the user, and identification information assigned to a recording medium readable by the terminal of the user;

acquiring designation information identifying a service requested by the user;

transmitting the first identification information and the designation information to a predetermined management server;

receiving second identification information from the predetermined management server, the second identification information being unique to the pairing of the user and a service provider selected to provide the requested service to the user; and accessing a server of the selected service provider by transmitting the second identification information without transmitting the first identification information.

14. A system for processing information, comprising:

a computer having a processor operable to execute instructions; and a computer-readable medium having recorded thereon a computer program having instructions for carrying out a method of issuing identification information, said method including:

acquiring first identification information including at least one selected from the group consisting of identification information assigned to a terminal of a user, identification information assigned to a peripheral device of the terminal of the user, and identification information assigned to a recording medium readable by the terminal of the user;

acquiring designation information identifying a service requested by the user;

transmitting the first identification information and the designation information to a predetermined management server;

receiving, from the predetermined management server, second identification information unique to the pairing of the user and a service provider selected to provide the requested service to the user; and accessing a server of the selected service provider to obtain the requested service by transmitting the second identification information to the server without transmitting the first identification information.

15. An information processing system, comprising:

a plurality of servers associated with a plurality of service providers;

a user terminal; and a management server; and a network connecting said plurality of servers, said user terminal, and said management server;

said management server being operable to receive first identification information identifying the user and designation information identifying a service requested by the user from said user terminal, to detect specific information that is assigned to a selected one of the plurality of service providers, the selected one of the plurality of service providers being capable of providing the requested service, the specific information being detected by referring to a database having stored therein the specific information, to generate second identification information using the detected specific information and the first identification information, the second identification information being unique to that pairing of the selected one of the plurality of service providers and the user, and to transmit the second identification information to the user terminal; and said user terminal being operable to access a particular one of the plurality of servers that is associated with the selected one of the plurality of service providers by transmitting the second identification information without transmitting the first identification information.

* * * * *

UNITED STATES PATENT AND TRADEMARK OFFICE
CERTIFICATE OF CORRECTION

PATENT NO. : 7,313,702 B2  Page 1 of 1
APPLICATION NO. : 10/243088
DATED : December 25, 2007
INVENTOR(S) : Muneki Shimada et al.

It is certified that error appears in the above-identified patent and that said Letters Patent is hereby corrected as shown below:

Column 10, line 66, "providinge" should read --providing--.

Column 11, line 14, "or" should read --for--.

Column 11, line 29, "providinge" should read --providing--.

Column 11, line 45, "execut" should read --execute--.

Column 11, lines 64-65, "providinge" should read --providing--.

Column 12, line 58, after "provider", insert --by--.

Signed and Sealed this

Sixth Day of January, 2009

JON W. DUDAS
*Director of the United States Patent and Trademark Office*